United States Patent
Adya et al.

(10) Patent No.: US 7,603,460 B2
(45) Date of Patent: Oct. 13, 2009

(54) DETECTING AND DIAGNOSING PERFORMANCE PROBLEMS IN A WIRELESS NETWORK THROUGH NEIGHBOR COLLABORATION

(75) Inventors: Atul Adya, Redmond, WA (US);
Paramvir Bahl, Sammamish, WA (US);
Ranveer Chandra, Ithaca, NY (US);
Lili Qiu, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 11/047,189

(22) Filed: Jan. 31, 2005

(65) Prior Publication Data
US 2006/0068769 A1 Mar. 30, 2006

Related U.S. Application Data

(60) Provisional application No. 60/613,055, filed on Sep. 24, 2004.

(51) Int. Cl.
*G06F 15/173* (2006.01)
(52) U.S. Cl. .................... 709/224; 709/221
(58) Field of Classification Search ......... 709/221–226; 726/22–23; 370/225, 328
See application file for complete search history.

(56) References Cited

U.S. PATENT DOCUMENTS

| | | | |
|---|---|---|---|
| 5,566,225 A * | 10/1996 | Haas | 455/423 |
| 5,729,680 A | 3/1998 | Belanger et al. | |
| 6,282,577 B1 | 8/2001 | Okanoue et al. | |
| 6,338,087 B1 | 1/2002 | Okanoue | |
| 6,370,146 B1 | 4/2002 | Higgins et al. | |
| 6,522,888 B1 | 2/2003 | Garceran et al. | |
| 6,587,432 B1 * | 7/2003 | Putzolu et al. | 370/229 |
| 6,664,925 B1 | 12/2003 | Moore et al. | |
| 6,721,305 B1 | 4/2004 | Chan et al. | |
| 6,799,047 B1 | 9/2004 | Bahl et al. | |
| 6,839,560 B1 | 1/2005 | Bahl et al. | |
| 6,857,012 B2 | 2/2005 | Sim et al. | |
| 6,990,428 B1 | 1/2006 | Kaiser et al. | |
| 6,992,625 B1 | 1/2006 | Krumm et al. | |

(Continued)

FOREIGN PATENT DOCUMENTS

WO WO 2004/068786 A1 8/2004

OTHER PUBLICATIONS

Adya, A., Bahl, P., Chandra, R., and Qiu, L. Architecture and techniques for diagnosing faults in IEEE 802.11 infrastructure networks. In *Proc. of ACM Conference on Mobile computing and networking*, 2004.
Aboba, B. and Simon, D. PPP EAP TLS Authentication Protocol. In *RFC 2716*, Oct. 1999.
Airdefense. Wireless LAN Security. Downloaded from http://airdefense.net. Jan. 24, 2005.

(Continued)

*Primary Examiner*—William C. Vaughn, Jr.
*Assistant Examiner*—Greg Bengzon
(74) *Attorney, Agent, or Firm*—Wolf, Greenfield & Sacks, P.C.

(57) ABSTRACT

Systems and methods are described for detecting and diagnosing performance problems in wireless communications networks. Diagnostic programs execute on a wireless device, neighboring devices, and a wireless access point to collaborate in diagnosing network problems. The neighboring devices eavesdrop on a diagnostic session between the device and the access point to determine problems at the device, the access point, and in the wireless medium. Data from the eavesdropping devices can be summarized and sent to a network administrator for further action. The diagnostic programs are described to contain a passive component for detecting problems, and an active component for running the diagnostic techniques.

12 Claims, 6 Drawing Sheets

U.S. PATENT DOCUMENTS

| | | | |
|---|---|---|---|
| 7,006,434 | B1 | 2/2006 | Klein et al. |
| 7,016,948 | B1* | 3/2006 | Yildiz ......................... 709/221 |
| 7,020,475 | B2 | 3/2006 | Bahl et al. |
| 7,047,287 | B2 | 5/2006 | Sim et al. |
| 7,068,599 | B1* | 6/2006 | Jiang et al. ............... 370/230.1 |
| 7,127,258 | B2 | 10/2006 | Zegelin |
| 7,133,909 | B2 | 11/2006 | Bahl |
| 7,159,026 | B2* | 1/2007 | Lau et al. .................... 709/226 |
| 7,184,421 | B1 | 2/2007 | Liu et al. |
| 7,184,435 | B2* | 2/2007 | Hsiao .......................... 370/389 |
| 7,233,286 | B2 | 6/2007 | Krumm et al. |
| 7,251,685 | B1* | 7/2007 | Yildiz ......................... 709/221 |
| 7,289,454 | B2* | 10/2007 | Bovo et al. .................. 370/252 |
| 7,317,914 | B2 | 1/2008 | Adya et al. |
| 7,339,914 | B2* | 3/2008 | Bhagwat et al. ............. 370/338 |
| 7,457,868 | B1* | 11/2008 | Guo ............................ 709/224 |
| 2001/0022615 | A1* | 9/2001 | Fernandez et al. .......... 348/143 |
| 2002/0025795 | A1 | 2/2002 | Sharon et al. |
| 2002/0105911 | A1* | 8/2002 | Pruthi et al. ................ 370/241 |
| 2002/0198984 | A1* | 12/2002 | Goldstein et al. ........... 709/224 |
| 2003/0018769 | A1* | 1/2003 | Foulger et al. .............. 709/223 |
| 2003/0118015 | A1 | 6/2003 | Gunnarsson et al. |
| 2003/0198191 | A1* | 10/2003 | Hsiao .......................... 370/254 |
| 2003/0217130 | A1* | 11/2003 | Tang et al. .................. 709/223 |
| 2003/0217289 | A1* | 11/2003 | Ammon et al. ............. 713/201 |
| 2003/0229696 | A1* | 12/2003 | Klein et al. ................. 709/224 |
| 2004/0015582 | A1* | 1/2004 | Pruthi ......................... 709/224 |
| 2004/0049565 | A1* | 3/2004 | Keller et al. ................ 709/223 |
| 2004/0054766 | A1* | 3/2004 | Vicente ...................... 709/223 |
| 2004/0066759 | A1* | 4/2004 | Molteni et al. .............. 370/329 |
| 2004/0185845 | A1 | 9/2004 | Abhishek et al. |
| 2005/0027858 | A1* | 2/2005 | Sloth et al. .................. 709/224 |
| 2005/0053008 | A1* | 3/2005 | Griesing et al. ............. 370/241 |
| 2005/0063317 | A1 | 3/2005 | Risberg et al. |
| 2005/0135236 | A1* | 6/2005 | Benson et al. .............. 370/225 |
| 2006/0046709 | A1 | 3/2006 | Krumm et al. |
| 2006/0077946 | A1 | 4/2006 | Adya et al. |
| 2006/0179140 | A1* | 8/2006 | John et al. .................. 709/225 |
| 2008/0102797 | A1* | 5/2008 | Coleman et al. ............ 455/411 |

OTHER PUBLICATIONS

Airmagnet. AirMagnet Distributed System. Downloaded from http://airmagnet.com. Jan. 24, 2005.

Airtight Networks. SpectraMon. Downloaded from http://www.airtightnetworks.com. Jan. 24, 2005.

Airwave. AirWave Management Platform. Downloaded from http://airwave.com. Jan. 24, 2005.

Allman, M., Eddy, W. and Ostermann, S. Estimating Loss Rates With TCP. In *ACM Perf. Evaluation Review 31* (3), Dec. 2003.

Atheros Communications. Downloaded from http://atheros.com. Jan. 24, 2005.

Awerbuch, B., Holmer, D. and Rubens, H. Provably Secure Competitive Routing against Proactive Byzantine Adversaries via Reinforcement Learning. In *JHU Tech Report Version 1*, May 2003.

Bahl, P. and Padmanabhan, V. N. Radar: An Inbuilding RF-based User Location and Tracking System. In *Proc. of IEEE INFOCOM*, Tel-Aviv, Israel, Mar. 2000.

Barford, P. and Crovella, M. Critical Path Analysis of TCP Transactions. In *Proc. of ACM SIGCOMM*, Stockholm, Sweden, Aug. 2000.

Bellardo, J. and Savage, S. Measuring Packet Reordering. In *Proc. of ACM Internet Measurement Workshop*, Marseille, France, Nov. 2002.

Bluetooth SIG. Location Working Group. http://bluetooth.org.

Buchegger, S. and Le Boudec, J. The Effect of Rumor Spreading in Reputation Systems for Mobile Ad-Hoc Networks. In *Proc. Of WiOpt*, France, Mar. 2003.

Chandra, R., Bahl, R. P. and Bahl, P. MultiNet: Connecting to Multiple IEEE 802.11 Networks Using a Single Wireless Card. In *Proc. of IEEE INFOCOM*, Hong Kong, Mar 2004.

Cisco. CiscoWorks Wireless LAN Solution Engine. Downloaded from http://cisco.com. Jan. 24, 2005.

Computer Associates. Unicenter Solutions: Enabling a Successful Wireless Enterprise. Downloaded from http://www3.ca.com/Files/WhitePapers/22996-enabling_a_successful.pdf Jan. 24, 2005.

Ethereal: A Network Protocol Analyzer. Downloaded from http://ethereal.com. Jan. 24, 2005.

Floyd, S., Handley, M., Padhye, J., and Widmer, J. Equation-Based Congestion Control for Unicast Applications. In *Proc. of ACM SIGCOMM*, Stockholm, Sweden, Aug. 2000.

Foley, J. D., van Dam, A., Feiner, S. K., and Hughes, J. F. *Computer Graphics Principles and Practice (2nd Edition)*. Addison Wesley, 1990.

IBM Research. Wireless Security Auditor (WSA). Downloaded from http://www.research.ibm.com/gsal/wsa. Jan. 24, 2005.

IEEE Computer Society. IEEE 802.1x-2001 IEEE Standards for Local and Metropolitan Area Networks: Port-Based Network Access Control, 1999.

IEEE Computer Society. Wireless LAN Medium Access Control (MAC) and Physical Layer (PHY) Specifications. *IEEE Standard 802.11*, 1999.

Ladd, A., Bekris, K., Rudys, A., Marceau, G., Kayraki, L., and Wallach, D. Robotics-Based Location Sensing using Wireless Ethernet. In *Proc. of ACM MobiCom*, Atlanta, GA, Sep. 2002.

Mahajan, R., Spring, N., Wetherall, D., and Anderson, T. User-level Internet Path Diagnosis. In *Proc. of ACM SOSP*, Bolton Landing, NY, Oct. 2003.

Marti, S., Giuli, T., Lai, K., and Baker, M. Mitigating Routing Misbehavior in Mobile Ad Hoc Networks. In *Proc. of ACM MobiCom*, Boston, MA, Aug. 2000.

Microsoft Corp. Native 802.11 Framework for IEEE 802.11 Networks. Downloaded from http://microsoft.com. Jan. 24, 2005.

Neuman, B. and Tso, T. An Authentication Service for Computer Networks. In *IEEE Communications*, Karlsruhe, Germany, Sep. 1994.

Padhye, J., Firoiu, V., Towsley, D., and Kurose, J. Modeling TCP Throughput: a Simple Model and its Empirical Validation. In *Proc. of ACM SIGCOMM*, Vancouver, BC, Sep. 1998.

Priyantha, N. B., Chakraborty, A. and Balakrishnan, H. The Cricket Location-Support System. In *Proc. of ACM MobiCom*, Boston, MA, Aug. 2000.

Qiu, L., Bahl, P., Rao, A., and Zhou, L. Fault Detection, Isolation, and Diagnosis in Multihop Wireless Networks. Technical Report MSR-TR-2004-11, Microsoft Research, Redmond, WA, Dec. 2003.

Raya, M., Hubaux, J. P., and I. Aad. DOMINO: A System to Detect Greedy Behavior in IEEE 802.11 Hotspots. In *Proc. of MobiSys*, Boston, MA, Jun. 2004.

Rigney, C., Rubens, A., Simpson, W., and Willens, S. Remote Authentication Dial In User Service (RADIUS). In *RFC 2138, IETF*, Apr. 1997.

Schulzrinne, H., Casner, S., Frederick, R. and Jacobson, V. RTP: A Transport Protocol for Real-Time Applications. In *RFC 1889, IETF*, Jan. 1996.

Stevens, R. *TCP/IP Illustrated (vol. 1): The Protocols*. Addison Wesley, 1994.

Symbol Technolgies Inc. SpectrumSoft: Wireless Network Management System. http://www.symbol.com.

Want, R., Hopper, A., Falcao, V. and Gibbons,J. The Active Badge Location System. *ACM Transactions on Information Systems*, 10(1), Jan. 1992.

WildPackets Inc. Airopeek Wireles LAN Analyzer. Downloaded from http://www.wildpackets.com. Jan. 24, 2005.

WinDump: tcpdump for Windows. Downloaded from http://windump.polito.it. Jan. 24, 2005.

Zhang, Y., Breslau, L, Paxson, V. and Shenker, S. On the Characteristics and Origins of Internet Flow Rates. In *Proc. of ACM SIGCOMM*, Pittsburgh, PA, Aug. 2002.

Zhang, Y., Duffield, N., Paxson, V., and Shenker, S. On the Constancy of Internet Path Properties. In *Proc. of ACM Internet Measurement Workshop*, San Francisco, CA, Nov. 2001.

European Search Report from European Application No. 05 108 256.8, dated Jan. 20, 2006.

\* cited by examiner

DETECTING AND DIAGNOSING PERFORMANCE PROBLEMS IN A WIRELESS NETWORK THROUGH NEIGHBOR COLLABORATION

CROSS-REFERENCE TO RELATED APPLICATIONS

The present application claims the benefit of Adya et al., U.S. Provisional Patent Application No. 60/613,055 entitled, "SYSTEM AND METHOD FOR DIAGNOSING FAULTS IN WIRELESS NETWORKS", filed on Sep. 24, 2004, which is hereby incorporated by reference in its entirety. The present application is related to co-pending applications with attorney reference numbers 231441 and 231446 entitled "USING A CONNECTED WIRELESS COMPUTER AS A CONDUIT FOR A DISCONNECTED WIRELESS COMPUTER" and "COLLABORATIVELY LOCATING DISCONNECTED CLIENTS AND ROGUE ACCESS POINTS IN A WIRELESS NETWORK", both filed on Jan. 31, 2005, and both hereby incorporated by reference in their entirety.

FIELD OF THE INVENTION

This invention relates generally to network operations, and more particularly, to diagnosing performance problems in wireless networks.

BACKGROUND OF THE INVENTION

The convenience of wireless networking has led to a widescale adoption of wireless networks (e.g., IEEE 802.11 networks). Corporations, universities, homes, and public places are deploying these networks at a remarkable rate. However, a significant number of "pain points" remain for end-users and network administrators. Users experience a number of problems such as intermittent connectivity, poor performance, lack of coverage, and authentication failures. These problems occur due to a variety of reasons such as poor access point layout, device misconfiguration, hardware and software errors, the nature of the wireless medium (e.g., interference, propagation), and traffic congestion. Users frequently complain about connectivity and performance problems, and network administrators are expected to diagnose these problems while managing corporate security and coverage. Their task is particularly difficult due to the unreliable nature of the wireless medium and a lack of intelligent diagnostic tools for determining the cause of these problems.

For companies with a large deployment of IEEE 802.11 networks, there may be several thousand Access Points (APs) spread over many buildings. Problems with the networks result in end-user frustration and loss of productivity for the corporation. Furthermore, resolution of each end-user complaint results in additional support personnel costs to a company's IT department; this cost can be several tens of dollars and this does not include the cost due to the loss of end-user productivity.

Fault diagnostics in IEEE 802.11 infrastructure networks has not garnered attention from the research community relative to other higher profile areas of research in wireless networking. Several companies attempt to offer diagnostic tools, but these products lack a number of desirable features. For example, they do not do a comprehensive job of gathering and analyzing the data to establish the possible causes of a problem. Furthermore, most products typically only gather data from the APs and neglect the client-side view of the network. Some products that monitor the network from the client's perspective require hardware sensors, which can be expensive to deploy and maintain. Also, current solutions do not typically provide any support for disconnected clients, even though these are the ones that need the most help.

BRIEF SUMMARY OF THE INVENTION

The problems outlined above may at least in part be addressed by a system and method for detecting and diagnosing faults in wireless networks as described herein.

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

In one embodiment, the systems and methods described herein may be used for analyzing performance problems faced in wireless LAN deployments. A flexible architecture for detecting and diagnosing faults in infrastructure wireless networks is also described. By applying instrumentation to wireless clients (and access points if possible) to monitor the wireless medium and devices that are nearby, this architecture may support both proactive and reactive fault diagnosis. This monitoring framework may be used to address some of the problems plaguing wireless users.

In one embodiment, a computer-readable medium is provided including computer-executable instructions facilitating diagnosis of communications problems experienced by a first wireless computing device in a wireless network, the wireless network comprising the first wireless computing device and a wireless access point, the computer-executable instructions executing on the first wireless computing device and performing the steps of determining that a communications problem exists in the wireless network, broadcasting a request to one or more neighboring wireless computing devices for assistance in diagnosing the communications problem, responding to snoop requests sent by the wireless access point in a diagnostic session, and receiving information about the diagnostic session from at least one of the neighboring wireless computing devices.

In another embodiment, a diagnostic system is provided for diagnosing problems on a computer network including both a wireless portion between a first wireless computing device and a wireless access point and a wired portion between the access point and an infrastructure network, the diagnostic system comprising a diagnostic client program running on the first wireless computing device, and a diagnostic access point program running on the wireless access point, the diagnostic access point program communicating with the diagnostic client program to determine whether a network connection problem occurs in the wired portion or the wireless portion of the network.

In still another embodiment, a computer-readable medium is provided including computer-executable instructions facilitating diagnosis of communications problems experienced by a first wireless computing device in a wireless network, the computer-executable instructions executing on a second wireless computing device and performing the steps of receiving a request for diagnostic help from the first wireless computing device, accumulating performance data by monitoring the wireless environment and traffic flow between the first wireless computing device and one or more wireless access points, and transmitting a summary of the accumulated performance data.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems to detect and diagnose wireless network performance problems will now be described with respect to preferred embodiments; however, the methods and systems of the present invention are not so limited. Moreover, the skilled artisan will readily appreciate that the methods and systems described herein are merely exemplary and that variations can be made without departing from the spirit and scope of the invention. After reviewing this description, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

Listed below are many of the problems that users and network administrators face when using and maintaining corporate wireless networks.

Connectivity problems: End-users complain about inconsistent or a lack of network connectivity in certain areas of a building. Such "dead spots" or "RF holes" can occur due to a weak RF signal, lack of a signal, changing environmental conditions, or obstructions. Locating an RF hole automatically is critical for wireless administrators; they can then resolve the problem by either relocating APs or increasing the density of APs in the problem area or by adjusting the power settings on nearby APs for better coverage.

Performance problems: This category includes all the situations where a client observes degraded performance, e.g., low throughput or high latency. There could be a number of reasons why the performance problem exists, e.g., traffic slow-down due to congestion, RF interference due to a microwave oven or cordless phone, multi-path interference, large co-channel interference due to poor network planning, or due to a poorly configured client/AP. Performance problems can also occur as a result of problems in the non-wireless part of the network, e.g., due to a slow server or proxy. It is therefore useful for the diagnostic tool to be able to determine whether the problem is in the wireless network or elsewhere. Furthermore, identifying the cause in the wireless part is important for allowing network administrators to better provision the system and improve the experience for end-users.

Network security: Large enterprises often use solutions such as IEEE 802.1x to secure their networks. However, a nightmare scenario for IT managers occurs when employees unknowingly compromise the security of the network by connecting an unauthorized AP to an Ethernet tap of the corporate network. The problem is commonly referred to as the "Rogue AP Problem". These Rogue APs are one of the most common and serious breaches of wireless network security. Due to the presence of such APs, external users are allowed access to resources on the corporate network; these users can leak information or cause other damage. Furthermore, Rogue APs can cause interference with other access points in the vicinity. Detecting Rogue APs in a large network via a manual process is expensive and time consuming; thus, it is important to detect such APs proactively.

Authentication problems: According to the IT support group's logs, a number of complaints are related to users' inability to authenticate themselves to the network. In wireless networks secured by technologies such as IEEE 802.1x, authentication failures are typically due to missing or expired certificates. Thus, detecting such authentication problems and helping clients to bootstrap with valid certificates is important. The present invention will be more completely understood through the following detailed description, which should be read in conjunction with the attached drawings. In this description, like numbers refer to similar elements within various embodiments of the present invention. Aspects of the invention are illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
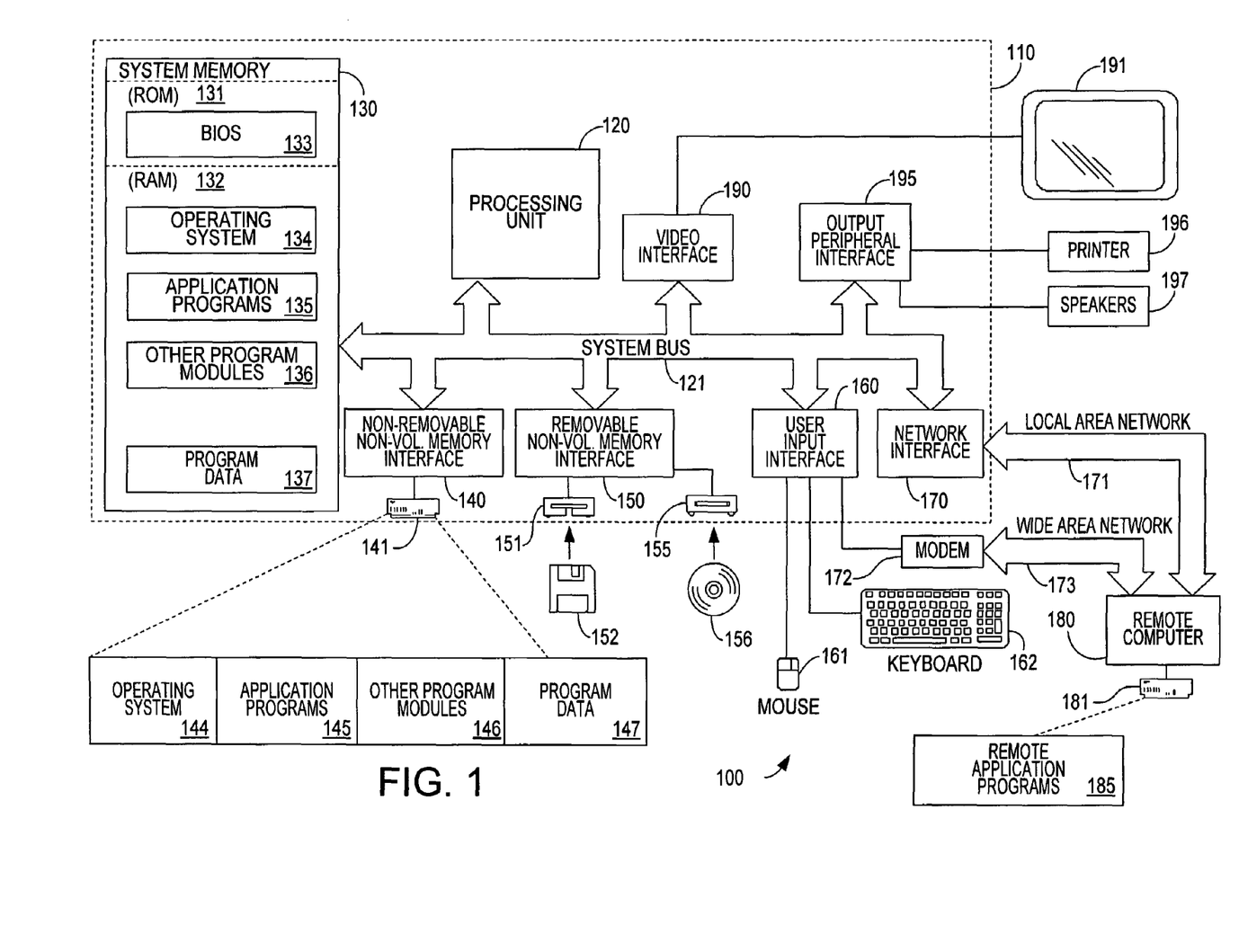
FIG. 1 is a simplified schematic illustrating an exemplary architecture of a computing, as used in accordance with an embodiment of the invention.

FIG. 1 illustrates an example of a suitable computing system environment 100 on which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. In particular, the computer 110 preferably contains a wireless networking interface or wireless card, operating according to an IEEE 802.11 protocol.

Figure 2:
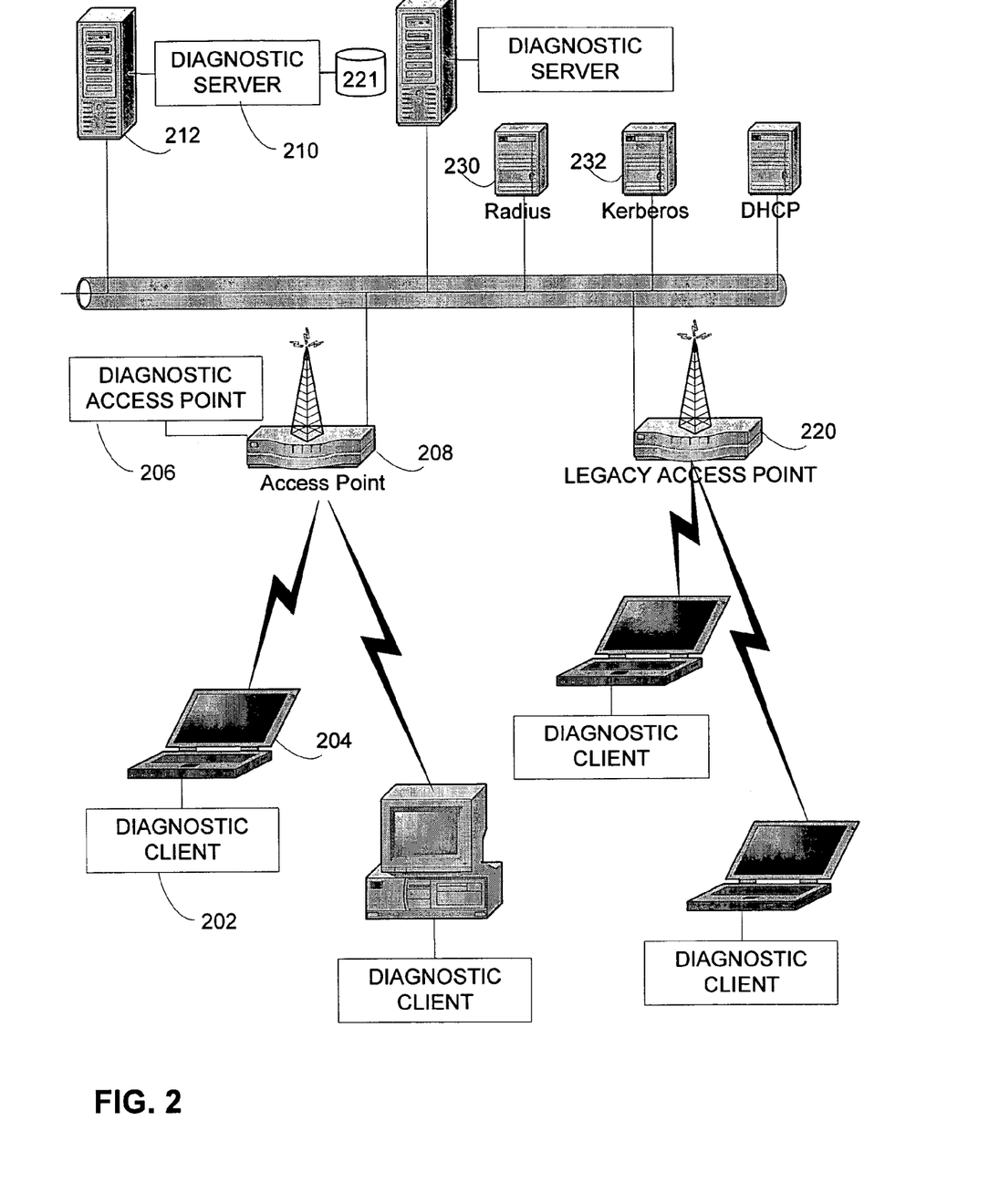
FIG. 2 is a diagram illustrating an exemplary wireless network for detecting and diagnosing network performance problems, in accordance with an embodiment of the invention.

In an embodiment of the invention, a system consists of several components, as illustrated in FIG. 2. A Diagnostic Client (DC) 202 is software that runs on a wireless client machine 204. A Diagnostic AP (DAP) 206 runs on an Access Point 208. A Diagnostic Server (DS) 210 runs on a backend server 212 of the organization.

In some embodiments of the invention, the Diagnostic Client module 202 monitors the RF environment and the traffic flow from neighboring clients 214 and APs 216. During normal activity, the client's wireless card is not placed in promiscuous mode. The DC 202 uses the collected data to perform local fault diagnosis. Depending on the individual fault-detection mechanism, a summary of this data is transmitted to the DAPs 206 or DSs 210 at preferably regular intervals. In addition, the DC 202 is programmed to accept commands from the DAP 206 or the DS 210 to perform on-demand data gathering, e.g., switching to promiscuous mode and analyzing a nearby client's performance problems. In case the wireless client 204 becomes disconnected, the DC 202 logs data to a local database/file. This data can be analyzed by the DAP 206 or DS 210 at some future time when network connectivity is resumed.

The Diagnostic AP 206 accepts diagnostic messages from DCs 202, merges them along with its own measurements and sends a summary report to the DS 210. Some embodiments of the invention do not include the Diagnostic AP 206. The DAP 206 offloads work from the DS 210. Some embodiments of the invention include a mixture of legacy APs 220 and DAPs 206: if an AP is a legacy AP 220 (for example, an AP not running a Diagnostic AP), its monitoring functions are performed by the DCs 202 and its summarizing functions and checks are performed at the DS 210.

The Diagnostic Server 210 accepts data from DCs 202 and DAPs 206 and performs the appropriate analysis to detect and diagnose different faults. The DS 210 also has access to a database 221 that stores each AP's 208 location. Network administrators can deploy multiple DSs 210 in the system to balance the load, for example, by hashing each AP's MAC address to a particular DS 210. In some embodiments, the Diagnostic Server 210 interacts with other network servers, such as a RADIUS 230 and Kerberos 232 servers, to get client authorization and user information.

The exemplary system described with reference to FIG. 2 supports both reactive and proactive monitoring. In proactive monitoring, DCs and DAPs monitor the system continuously: if an anomaly is detected by a DC, DAP, or DS, an alarm is raised for a network administrator to investigate. The reactive monitoring mode is used when a support personnel wants to diagnose a user complaint. The personnel can issue a directive to a particular DC from one of the DSs to collect and analyze the data for diagnosing the problem.

The exemplary system imposes negligible overheads with respect to power management. Both the proactive and reactive techniques described later consume very little bandwidth, CPU, or disk resources; as a result, they have negligible impact on battery consumption. The exemplary system architecture shown in FIG. 2 supports several functions in embodiments of the invention by using the DCs, DAPs and DSes. Some of the supported functions include: locating disconnected clients; helping disconnected clients; isolating performance problems; and detecting rogue access points.

In some embodiments of the invention, the DAP 206 is a software modification on AP 208, allowing for better scalability and for analyzing an AP's performance. Since no hardware modifications are necessary, the bar for deploying this embodiment is lower.

The client machines 204 and access points 208 preferably have the ability to control beacons and probes. Additionally, client machines 204 preferably have the capability of starting an infrastructure network (i.e., becoming an AP) or an ad hoc network (i.e., computer-to-computer) on their own; this ability is supported by many wireless cards currently available in the marketplace. Some embodiments of the invention make use the presence of nearby clients or access points. By taking advantage of nearby clients and access points instrumented with software "sensors", deployment costs are potentially lowered.

The backend server 212 preferably uses a database to maintain the location of all the access points in the network. Such location databases are preferably maintained by network administrators.

The exemplary system illustrated in FIG. 2 can scale with the number of clients and APs in the system. The system contains two shared resources: DSs and DAPs. To prevent a single Diagnostic Server from becoming a potential bottleneck, additional DSs are preferably added as the system load increases. Furthermore, some embodiments allow each individual DS to offload work by sharing the diagnosis burden with the DCs and the DAPs; the DS is used only when the DCs and DAPs are unable to diagnose the problem and the analysis requires a global perspective and additional data (e.g., signal strength information obtained from multiple DAPs may be needed for locating a disconnected client).

Similarly, since the DAP is a shared resource, making it do extra work can potentially hurt the performance of all its associated clients. To reduce the load on a DAP, some embodiments of the invention use an optimization technique, whereby an AP does not perform active scanning if any client is associated with it; the associated clients perform these operations as needed. The AP continues to perform passive monitoring activities that have a negligible effect on its performance. If there is no client associated, the AP is idle and it can perform these monitoring operations. This approach ensures that most of the physical area around the AP is monitored without hurting the AP's performance.

In one embodiment, the interactions between the DC, DAP, and DS are secured using EAP-TLS certificates issued over IEEE 802.1x. An authorized certification authority (CA) issues certificates to DCs, DAPs and DSs; these certificates are used to ensure that all communication between these entities is mutually authenticated. One embodiment includes known techniques for detecting malicious behavior by legitimate users.

Figure 3:
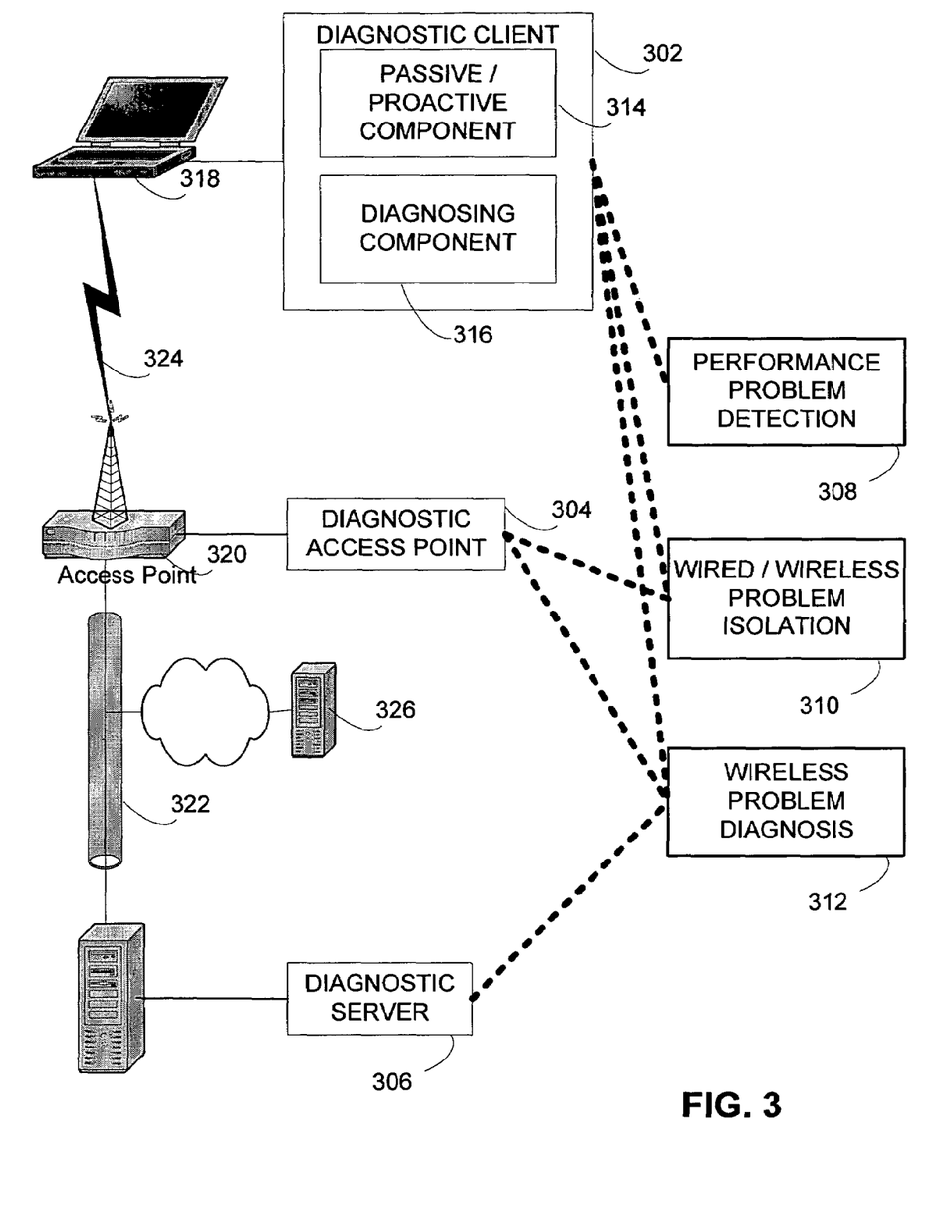
FIG. 3 is a diagram illustrating an exemplary architecture for detecting and diagnosing network performance problems, in accordance with an embodiment of the invention.

Turning attention to FIG. 3, techniques for detecting and diagnosing performance problems in an IEEE 802.11 wireless network are now described, in accordance with an embodiment of the invention. There are three separate phases performed by various combinations of the diagnostic clients 302, access points 304 and servers 306: a problem detection phase 308; a problem isolation phase 310; and a problem diagnosis phase 312. The detection phase 308 is preferably performed by the diagnostic client 302, which comprises two lightweight components: a proactive/passive monitoring component 314 and a reactive diagnosing component 316. The monitoring component 314 runs in the background at the client and informs the diagnosing component 316 when it detects connections experiencing poor performance. At this point, the diagnosing component 316 analyzes the connections and outputs a report that gives a breakdown of the delays, i.e., the extent of the delays in the wired and the wireless part, and for the latter, a further breakdown into delays at the client 318, AP 320, and the medium 322 and 324. The monitoring component 314 is preferably conservative in declaring that network problems are being encountered; a false alarm invokes the diagnosing component 316. Since this component has low overheads, invoking it has a small impact on the performance of clients 318 and APs 320.

In one embodiment, performance problems are diagnosed for TCP connections since TCP is the most widely used transport protocol in the Internet. For a TCP connection, passive diagnosis is accomplished by leveraging the connection's data and acknowledgment (ACK) packets. For other transport protocols, end-to-end loss-rate and round-trip times are computed using either active probing or performance reports (e.g., RTCP reports).

Turning more specifically to the detection phase 308, embodiments of the invention recognize that network performance problems can manifest themselves in different ways, such as low throughput, high loss rate, and high delay. In some embodiments, throughput is not used as a metric for detecting a problem since it is dependent on the workload (i.e., the client's application may not need a high throughput) and on specific parameters of the transport protocol (e.g., initial window size, sender and receive window size in TCP). Instead, in these embodiments, packet loss rate and round-trip time are used for detecting performance problems.

To estimate the round trip time (RTT) in a TCP connection, embodiments of the invention check whether the client is a sender. If so, it already keeps track of the RTT; if the client is a receiver, it can apply heuristics to estimate the round-trip time, such as those proposed by Zhang et al., in "On the Characteristics and Origins of Internet Flow Rates" in Proceedings of ACM SIGCOMM, August 2002, which is hereby incorporated by reference in its entirety for all that it teaches without any exclusion of any part thereof.

To estimate the loss rate, the diagnostic client 302 in embodiments of the invention use heuristics suggested by Floyd et al. in "Equation-Based Congestion Control for Unicast Applications" in Proceedings of ACM SIGCOMM, August 2000, and by Allman et al. in "Estimating Loss Rates with TCP" in ACM Perf. Evaluation Review 31(3), December 2003, which are hereby incorporated by reference in their entirety for all that they teach without any exclusion of any part thereof. Different loss rates are computed for packets sent and received by the client 318. For data packets sent by the client 318, the loss rate is estimated as the ratio of retransmitted packets to the packets sent over the last L RTTs. This estimation mechanism assumes that the TCP implementation uses Selective ACKs so that loss rate is not overestimated unnecessarily; this is a reasonable assumption since a number of operating systems now support this option by default, e.g., Windows, Linux, Solaris. Although this estimate may be higher than the actual loss rate when timeouts occur in a TCP connection, this inaccuracy is acceptable for two reasons: first, if a TCP connection is experiencing timeouts, it is probably experiencing problems and is worth diagnosing; second, the only consequence of a mistake is to trigger our diagnosis component, which incurs low overhead. If more accurate analysis is needed, the LEAST approach suggested by Allman et al. is preferably used.

For the data packets received by the client 318, embodiments of the invention use the following approach to estimate the number of losses: if a packet is received such that its starting sequence number is not the next expected sequence number, the missing segment is considered lost. The loss rate is estimated as the ratio of lost packets to the total number of expected packets in the last L RTTs. Note that the expected number of bytes is calculated as the maximum observed sequence number minus the minimum during the last L RTTs. The maximum segment size (MSS) is estimated using methods such as those taught by Zhang et al., and the number of packets is estimated by dividing the number of bytes by MSS.

The monitoring component 314 triggers the diagnosis component 316 if a connection is very lossy or it experiences high delay. A connection is detected as experiencing high delays if the RTT of a particular packet is more than a given threshold (e.g., 250 msec) or is higher than some multiple (e.g., twice) of the current TCP RTT. To avoid invoking a diagnosis algorithm for high delays that occur temporarily, connections are flagged only when some variable D or more packets experience a high delay. A connection is classified as lossy if its loss rate (for transmitted or received packets) is higher than some threshold L (e.g., 5%). Both D and L are configurable parameters and each represents a tradeoff between responsiveness of the detection component and unnecessary invocation of the diagnosis component. That is, with a low value of D or L, any change in delays/losses will be detected quickly but it may also result in invoking the diagnosis component unnecessarily. For high values, apart from slow responsiveness, another problem occurs: the TCP connection may end before sufficient number of samples have been collected. Such a situation can occur with short Web transfers. Embodiments of the invention alleviate this problem by aggregating loss rate and delay information between the client 318 and remote hosts 326 across TCP connections.

Figure 4:
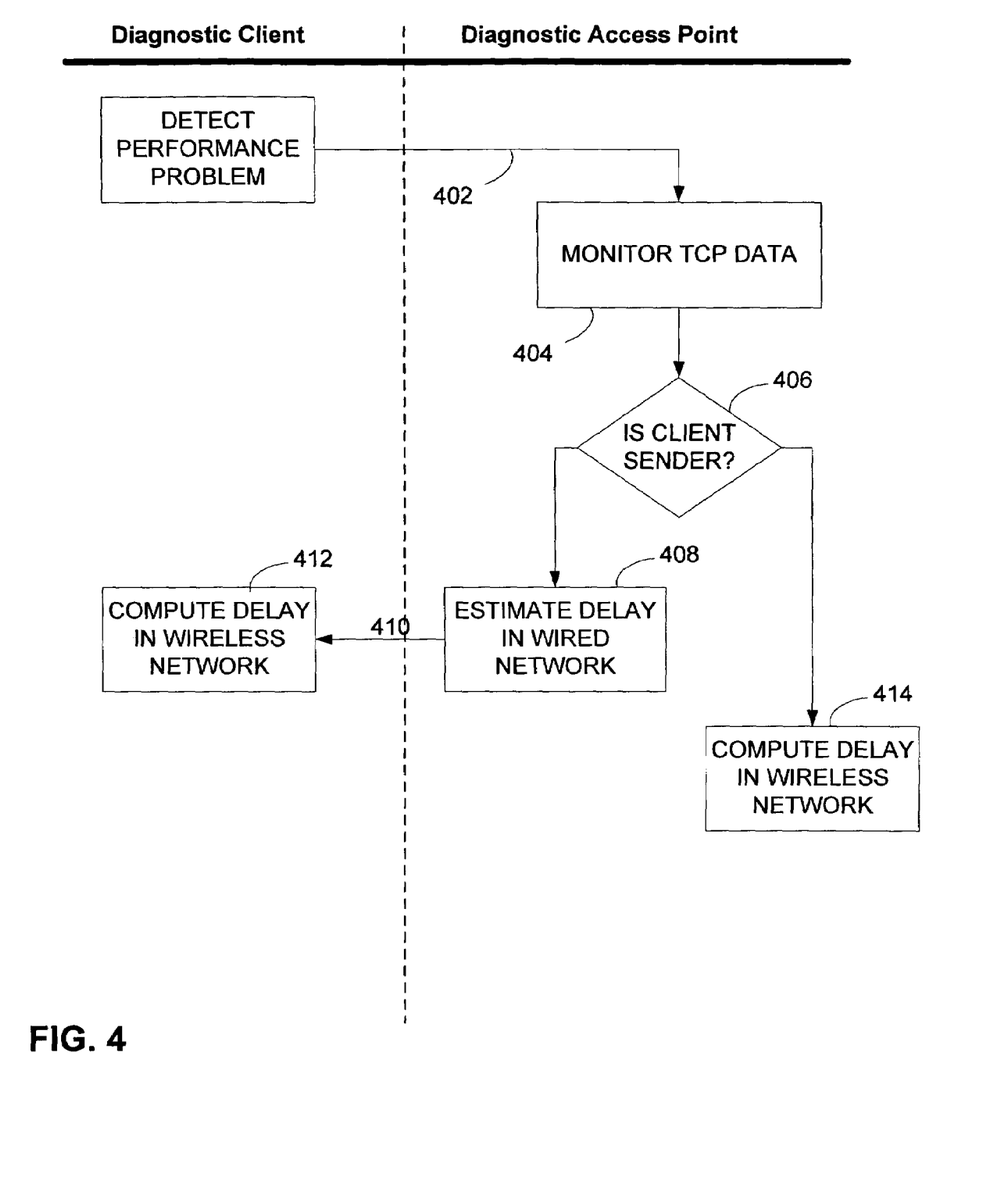
FIG. 4 is a flow diagram illustrating a method for computing delays in a wireless network, in accordance with an embodiment of the invention.

Once a network performance problem has been detected in the problem detection phase 308, the DC 302 at the client 318 communicates with its associated DAP 304 to differentiate between the delays on the wired 322 and wireless 324 parts of the path, in the problem isolation phase 310. A method used by embodiments of the invention to isolate wired and wireless performance problems is described with reference to FIG. 4. Once the DC notifies the DAP of the performance problem at step 402, the DAP then starts monitoring the TCP data and ACK packets for that client's connection at step 404. The DAP determines whether the client is a sender or receiver in the TCP connection at step 406. If the client is a sender, the DAP computes at step 408 the difference between the received time of a data packet from the client to the remote host and the corresponding TCP ACK packet; this time difference is an estimate of the delay incurred in the wired network. To ensure that the roundtrip time estimate is reasonable, various heuristics used by TCP are preferably applied to these roundtrip measurements as well, e.g., Karn's algorithm, described by Stevens in "TCP/IP Illustrated (Vol. I): The Protocols", Addison Wesley, 1994, which is hereby incorporated by reference in its entirety for all that it teaches without exclusion of any part thereof. At step 410, the DAP sends this estimate to the DC who can now determine the wireless part of the delay at step 412 by subtracting this estimate from the TCP roundtrip time. If the client is a receiver, then in one embodiment, a similar approach is used to compute this breakdown: the DAP determines the wireless delay by monitoring at step 414 the data packets from the remote host to the client and the corresponding ACK packets. Note that the amount of state maintained at the DAP is small since it corresponds to the number of unacknowledged TCP packets; this can be reduced further by sampling.

Returning to FIG. 3, a client 318 may experience poor wireless performance due to a number of reasons, such as an overloaded processor at the AP 320 or the client, problems in the wireless medium 324, some driver or other kernel issues at either the AP 320 or the client 318. Embodiments of the invention quantify the effect of these problems by observing their impact on packet delay in the wireless network path. These performance problems fall into three categories: packet delay at the client 318, packet delay at the AP 320, and packet delay in the wireless medium 324. Embodiments use a collaborative scheme, called Estimating Delay using Eavesdropping Neighbors or EDEN, which leverages the presence of other clients to quantify the delay experienced in each of the above categories. Since electromagnetic waves travel at the speed of light, it is safe to assume that RF propagation delays are negligible relative to the client or AP delays. When a client's 318 performance diagnosis component 316 is triggered by its problem detection component 314, it starts broadcasting packets asking for diagnosis help from nearby clients. All clients who hear these packets switch to promiscuous mode (or "eavesdropping" mode) and ask the DAP 304 to start the diagnosis. Security mechanisms, such as those discussed in co-pending application entitled, "USING A CONNECTED WIRELESS COMPUTER AS A CONDUIT FOR A DISCONNECTED WIRELESS COMPUTER", filed Jan. 31, 2005 with attorney docket number 231441, can be used to prevent attacks on these clients. Note that the use of multiple snooping clients in EDEN provides robustness: multiple clients increase the likelihood that at least one client hears the EDEN protocol requests and responses discussed below.

Figure 5:
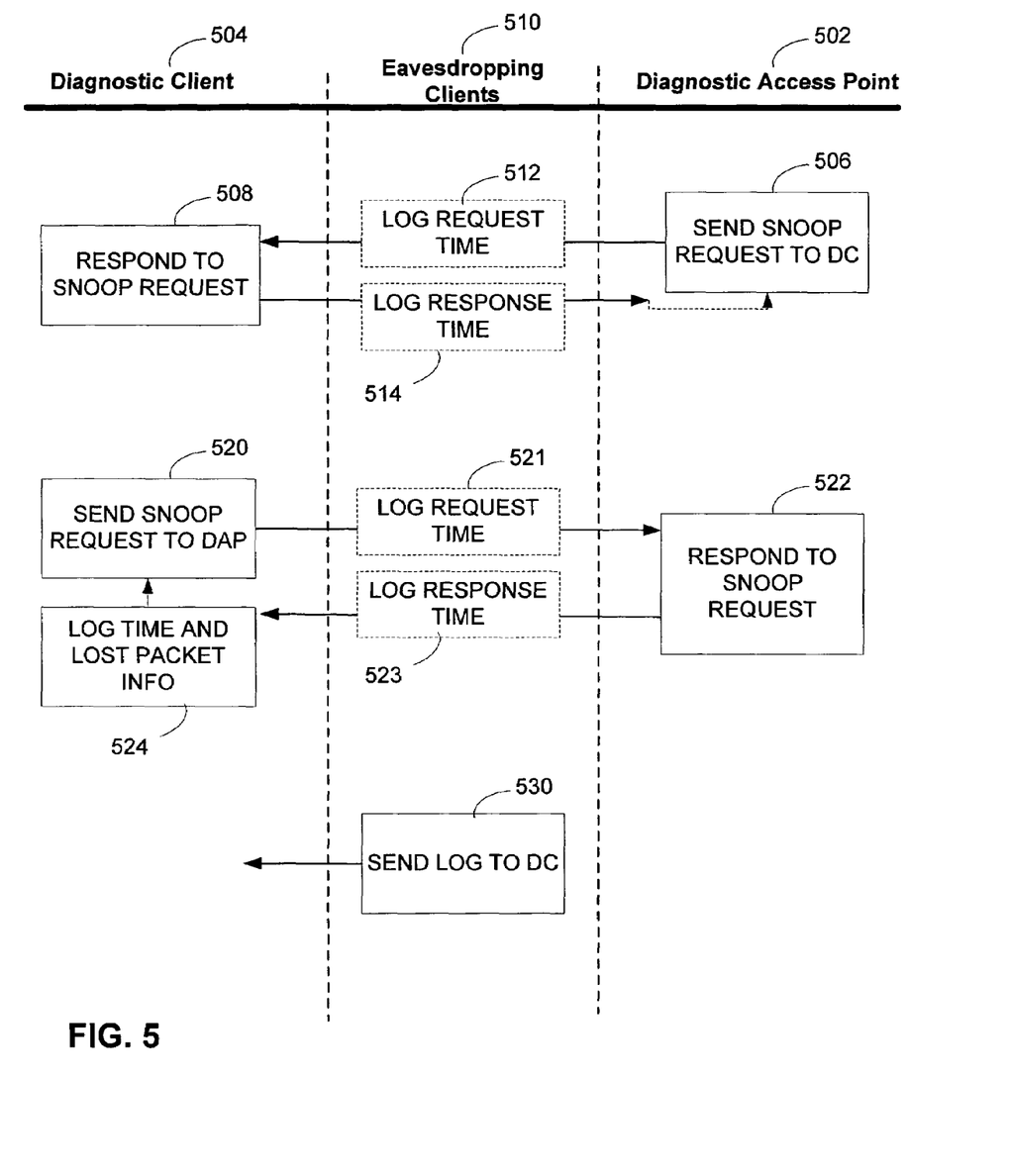
FIG. 5 is a flow diagram illustrating a method for collaboratively diagnosing wireless network communications problems using neighboring wireless devices, in accordance with an embodiment of the invention.

EDEN proceeds in two phases, described now with reference to FIG. 5. In the first phase, the DAP 502 to which the client 504 is associated estimates the delay at the client 504. The DAP 502 periodically (say every 2 seconds, for example) sends Snoop request packets to the client 504 at step 506. When the client 504 receives a Snoop request packet, it immediately replies with a Snoop response message at step 508. The eavesdropping clients 510 log the time when they hear a Snoop request at step 512 and the first attempt by the client 504 to send the corresponding Snoop response packet at step 514, i.e., only the times of response packets for which the retransmission bit is clear are recorded. If an eavesdropping client 510 misses either of these packets, it ignores the timing values for that request/response pair. The difference between the recorded times is the client delay, i.e., application and OS delays experienced by the client after receiving the request packet. For robustness, Snoop requests are preferably sent a number of times (say 20); the client and AP delays are averaged over all these instances.

In the second phase, a similar technique is used to measure the AP delay, i.e., the client 504 sends the Snoop request packets at step 520 and the AP 502 sends the responses at step 522. The eavesdropping clients 510 log the requests and response times at steps 521 and 523. The client 504 also records the round trip times to the AP for these Snoop requests and responses along with the number of request packets for which it did not receive a response, e.g., the request or response was lost, at step 524.

The client and AP delay may include delay due to contention experienced in the wireless medium. Empirical studies have shown such contention-caused delay does not prevent EDEN from estimating delays with reasonable accuracy.

At the end of the protocol, preferably all the eavesdropping clients 510 send the AP and client delay times to the diagnostic client 504. The difference between the round trip time reported by the client, and the sum of the delays at the client and the AP, approximates the sum of the delay experienced by the packet in the forward and backward wireless link. The diagnostic client 504 can then report the client/AP/medium breakdown to the network administrator; it can also report the percentage of unacknowledged request packets as an indicator of the network-level loss rate on the wireless link.

In an alternative embodiment of the invention, the wireless access point detects network performance problems by executing the steps of EDEN described above. In such an embodiment, the wireless access point can monitor network traffic for lost packets and packet delays, and can further participate in a snoop protocol with a client or another access point. The access point notifies neighboring clients to eavesdrop on the protocol, and receives the collected information to determine the nature of the problem.

Figure 6:
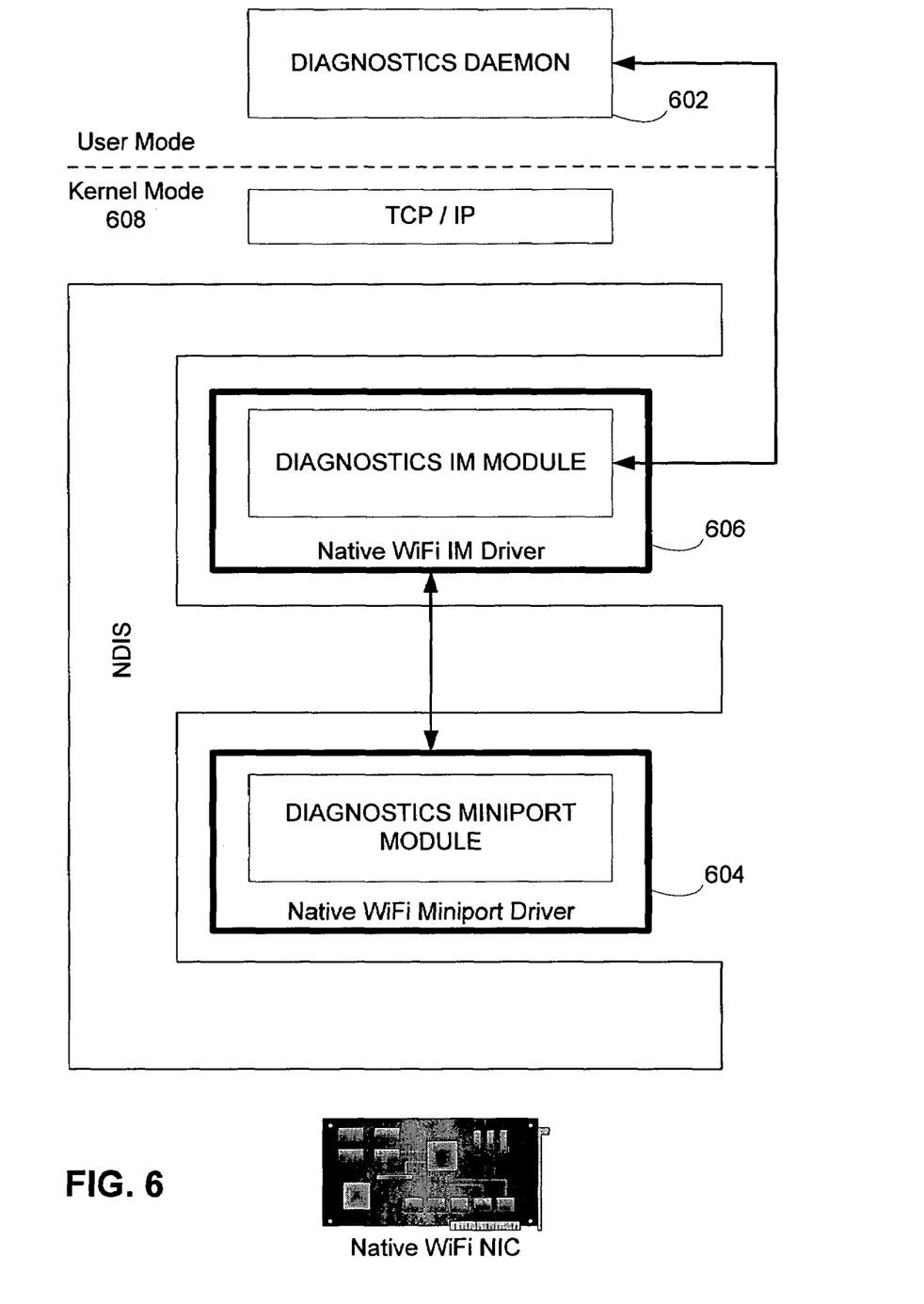
FIG. 6 is a schematic diagram of software components used for diagnosing wireless communication problems, in accordance with an embodiment of the invention.

Turning attention to FIG. 6, details of one embodiment of an implementation are shown. The basic architecture consists of the DC, DAP and DS daemons running on clients, access points and servers, respectively. The system can be implemented, for example, on the MICROSOFT WINDOWS operating system with standard commercial 802.11b cards. On the DS, the daemon process accepts information from DAPs. The DS reads the list of legitimate APs from a file or database. The structure of the code on the DC or DAP preferably comprises a user-level daemon 602 and kernel level drivers 604 and 606. These pieces are structured such that code is added to the kernel drivers 604 and 606 only if the functionality cannot be achieved in the user-level daemon 602 or if the performance penalty is too high.

There are two kernel drivers in the exemplary system—a miniport driver 604 and an intermediate driver (IM driver) 606, such as the Native WiFi driver in the MICROSOFT WINDOWS operating system. The miniport driver 604 communicates directly with the hardware and provides basic functionalities such as sending/receiving packets, setting channels, etc. It exposes sufficient interfaces such that functions like association, authentication, etc. can be handled in the IM driver 606. The IM driver 606 supports a number of interfaces (exposed via ioctls) for querying various parameters such as the current channel, transmission level, power management mode, SSID, etc. In addition to allowing the parameters to be set, it allows the user-level code to request for active scans, associate with a particular SSID, capture packets, etc. In general, it provides a significant amount of flexibility and control to the user-level code.

Even though many operations are already present in the IM driver 606, embodiments of the invention used modifications to expose certain functionalities and to improve performance of specific protocols. The miniport driver 604 is preferably changed minimally to expose certain types of packets to the IM driver 606. In the IM driver 606, the following support is preferably added: capturing packet headers and packets; storing the RSSI values from received packets; keeping track of AP information; and kernel event support for protocol efficiency. These modifications are now discussed in further detail.

Capturing packet headers and packets: Embodiments of the invention allow filters to be set such that only certain packets or packet headers are captured, e.g., filters based on specific MAC addresses, packet types, packet subtypes (such as management and beacon packets), etc.

Storing the RSSI values from received packets: Embodiments of the invention obtain the RSSI value of every received packet and maintain a table called the NeighborInfo table that keeps track of the RSSI value from each neighbor (indexed on the MAC address). An exponentially weighted average is maintained with the new value given some weighting factor of, for example, 0.25.

Keeping track of AP information: In the NeighborInfo table, embodiments keep track of the channels on which packets were heard from a particular MAC address, SSID information (from beacons), and whether the device is an AP or a station.

Kernel event support for protocol efficiency: An event is preferably added that is shared between the kernel and user-level code. The kernel triggers this event when an "interesting" event occurs; this allows some of the protocols to be interrupt-driven rather being polling based.

Additionally, a number of ioctls are preferably added to get and clear the information discussed above.

In embodiments of the invention, the diagnostics daemon 602 runs on a device and gathers information and implements various mechanisms discussed above. If the device is an AP, it communicates diagnostic information with the DS and the DCs; if the device is just a DC, it communicates with its associated AP to convey the diagnostic information. The Diagnostic daemon on the DC obtains the current NeighborInfo table from the kernel 608 at a periodic interval, for example every 30 seconds. If any new node has been discovered or if the existing data has changed significantly (e.g., RSSI value of a client has changed by more than a factor of 2), it is sent to the DAP. The DAP also preferably maintains a similar table indexed on MAC addresses. However, it only sends information about disconnected clients and APs to the DS; otherwise, the DS would end up getting updates for every client in the system, making it less scalable. The DAP sends new or changed information about APs to the DS periodically (e.g., 30 seconds). Furthermore, if the DAP has any pending information about a disconnected client D, it informs the DS immediately so that the disconnected can be serviced in a timely fashion. All messages from the DC to the DAP and from DAP to the DS are preferably sent as XML messages. A sample message format from the DC is shown below (timestamps have been removed):

```
<DiagPacket Type="RSSIInfo" TStamp="...">
  <Clients TStamp="...">
    <MacInfo MAC="00:40:96:27:dd:cc" RSSI="23"
      Channels ="19" SSID="" TStamp="..."/>
  </Clients>
  <Real-APs TStamp="...">
    <MacInfo MAC="00:20:a6:4c:c7:85" RSSI="89"
```

-continued

```
      Channels="12" SSID="UNIV_LAN" TStamp="..."/>
    <MacInfo MAC="00:20:a6:4c:bb:ad" RSSI="7"
      Channels="10" SSID="EXPER" TStamp="..."/>
  </Real-APs>
  <Disconnected-Clients TStamp="...">
    <MacInfo MAC="00:40:96:33:34:3e" RSSI="57"
      Channels="2048" SSID="SOS_764" TStamp="..."/>
  </Disconnected-Clients>
</DiagPacket>
```

As the sample message shows, the DC sends information about other connected clients, APs, and disconnected clients. For each such class of entities, it sends the MAC address of a machine along with RSSI, SSID, and a channel bitmap which indicates the channels on which the particular device was overheard.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-readable storage medium including computer-executable instructions facilitating diagnosis of communications problems experienced by a first wireless device in a wireless network, wherein the first wireless device is either a wireless computing device or a wireless access point, the computer-executable instructions executing on the first wireless device and performing the steps of:

determining that a communications problem exists in the wireless network;

broadcasting a request to one or more neighboring wireless devices for assistance in diagnosing the communications problem, wherein the neighboring wireless devices that hear the request for assistance switch to an eavesdropping mode;

responding to diagnostic session requests sent by a second wireless device in a diagnostic session; and receiving information about the diagnostic session from at least one of the neighboring wireless devices in the eavesdropping mode, which serves as an eavesdropping client, the information about the diagnostic session based on monitoring, by the eavesdropping client, of times of receipt of the diagnostic session requests sent by the second wireless device to the first wireless device and of times of receipt of corresponding diagnostic session responses sent by the first wireless device to the second wireless device, the received information about the diagnostic session facilitating diagnosis of the communications problem.

2. The computer-readable storage medium of claim 1, the computer-executable instructions further performing the step of:

sending diagnostic session requests to the second wireless device in the diagnostic session.

3. The computer-readable storage medium of claim 1 wherein the information about the diagnostic session contains estimates of one or more of: packet delay or packet loss rates.

4. The computer-readable storage medium of claim 1 wherein the first wireless device is a wireless computing device, and wherein the second wireless device is a wireless access point.

5. The computer-readable storage medium of claim 1, the computer-executable instructions further performing the step of:
determining, using the information about the diagnostic session, the extent to which the communications problem is caused by one or more of: the first wireless device; the second wireless device; or the wireless medium between the first wireless device and the second wireless device.

6. The computer-readable storage medium of claim 1, the computer-executable instructions further performing the step of:
reporting results of the diagnostic session to a network administrator.

7. A computer-readable storage medium including computer-executable instructions facilitating diagnosis of communications problems experienced by a first wireless computing device in a wireless network, the computer-executable instructions executing on a second wireless computing device and performing the steps of:
receiving a request for diagnostic help from the first wireless computing device;
in response to the request for diagnostic help, the second wireless device switch to an eavesdropping mode and serving as an eavesdropping client, and accumulating performance data by monitoring of times of receipt of diagnostic session requests sent by a wireless access point to the first wireless computing device in a diagnostic session and of times of receipt of corresponding diagnostic session responses sent by the first wireless computing device to the wireless access point in the diagnostic session; and
transmitting a summary of the accumulated performance data to the first wireless computing device, the summary of the accumulated performance data facilitating diagnosis of the communications problems experienced by the first wireless computing device.

8. The computer-readable storage medium of claim 7, the computer-executable instructions further performing the step of requesting a diagnostic access point program running on a wireless access point to begin a diagnostic protocol with the first wireless computing device.

9. The computer-readable storage medium of claim 7 wherein accumulating performance data comprises estimating the communications delay caused by the first wireless computing device.

10. The computer-readable storage medium of claim 9 wherein the communications delay is estimated to be the amount of time between hearing the diagnostic session request and the corresponding diagnostic session response.

11. The computer-readable storage medium of claim 7 wherein accumulating performance data comprises estimating the communications delay caused by the wireless access point.

12. A method for facilitating diagnosis of communication problems experienced by a first wireless device in a wireless network, wherein the first wireless device is either a wireless computing device or a wireless access point, the method comprising:
determining that a communications problem exists in the wireless network;
broadcasting a request to one or more neighboring wireless devices for assistance in diagnosing the communications problem, wherein the neighboring wireless devices that hear the request for assistance switch to an eavesdropping mode;
responding to diagnostic session requests sent by a second wireless device in a diagnostic session; and
receiving information about the diagnostic session from at least one of the neighboring wireless devices in the eavesdropping mode, which serves as an eavesdropping client, the information about the diagnostic session based on monitoring, by the eavesdropping client, of times of receipt of the diagnostic session requests sent by the second wireless device to the first wireless device and of times of receipt of corresponding diagnostic session responses sent by the first wireless device to the second wireless device, the received information about the diagnostic session facilitating diagnosis of the communications problem.

* * * * *

UNITED STATES PATENT AND TRADEMARK OFFICE
CERTIFICATE OF CORRECTION

| | |
|---|---|
| PATENT NO. | : 7,603,460 B2 |
| APPLICATION NO. | : 11/047189 |
| DATED | : October 13, 2009 |
| INVENTOR(S) | : Atul Adya et al. |

Page 1 of 1

It is certified that error appears in the above-identified patent and that said Letters Patent is hereby corrected as shown below:

In The Claims:

In column 15, line 31, in Claim 7, delete "switch" and insert -- switching --, therefor.

Signed and Sealed this
First Day of February, 2011

David J. Kappos
*Director of the United States Patent and Trademark Office*